(No Model.)
J. O. HEBERT.
POLE TIP.
No. 498,548. Patented May 30, 1893.
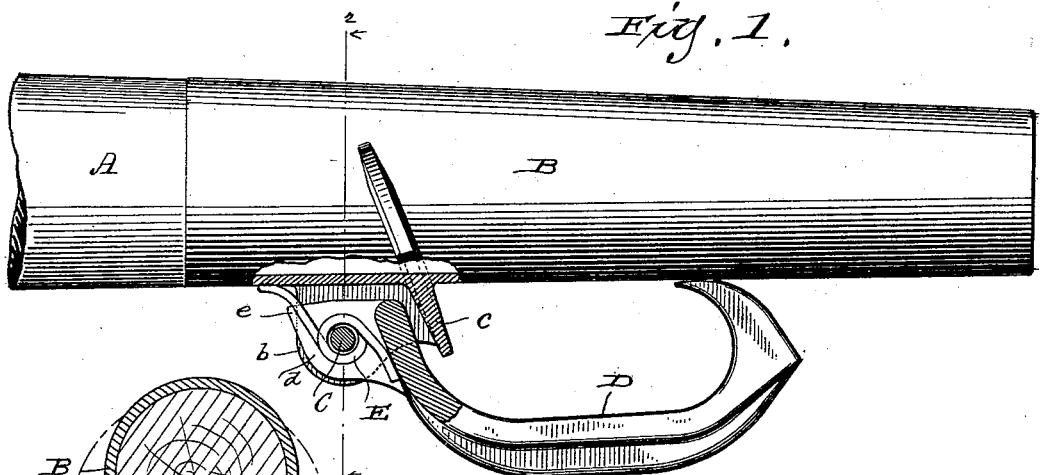
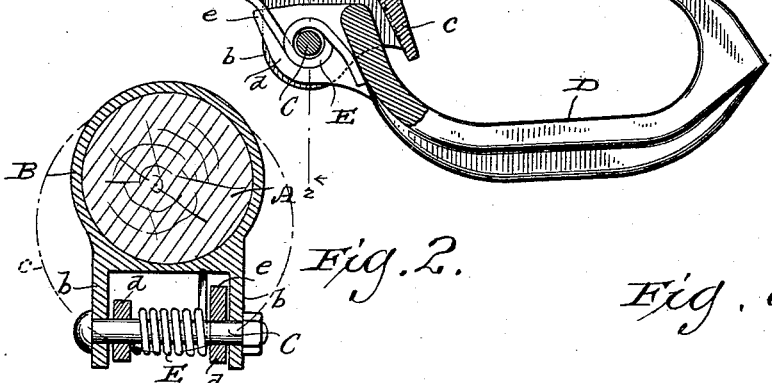
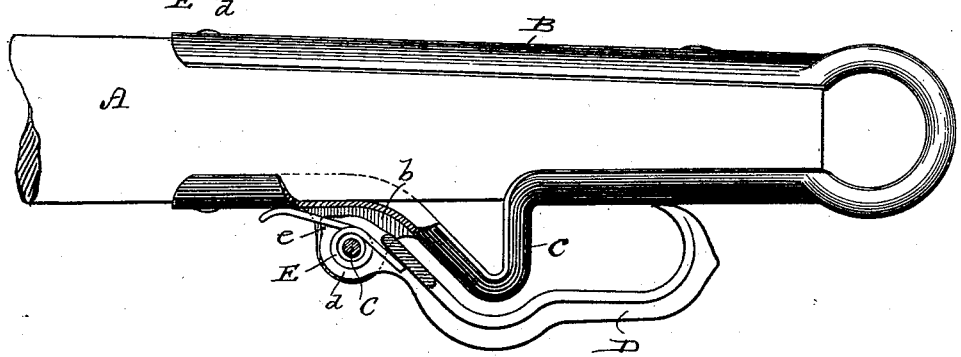
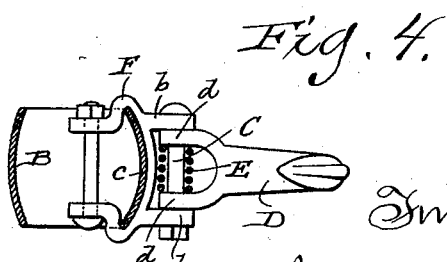
Witnesses
Geo. W. Toomy
N. E. Oliphant
Inventor
Joseph O. Hebert.
By H. G. Underwood
Attorney
THE NORRIS PETERS CO., PHOTO-LITHO., WASHINGTON, D. C.

UNITED STATES PATENT OFFICE.

JOSEPH O. HEBERT, OF GRAND RAPIDS, WISCONSIN.

POLE-TIP.

SPECIFICATION forming part of Letters Patent No. 498,548, dated May 30, 1893.

Application filed January 3, 1893. Serial No. 457,031. (No model.)

*To all whom it may concern:*

Be it known that I, JOSEPH O. HEBERT, a citizen of the United States, and a resident of Grand Rapids, in the county of Wood, and in the State of Wisconsin, have invented certain new and useful Improvements in Pole-Tips and Shaft-Irons; and I do hereby declare that the following is a full, clear, and exact description thereof.

My invention has for its object to simplify and improve the means set forth in my prior patent No. 460,578, granted October 6, 1891, for preventing accidental disengagement of a neck-yoke ring (not shown) from a vehicle-pole, the same means being also applicable to shafts or thills to serve as hold-backs; said invention consisting in certain peculiarities of construction and combination of parts hereinafter described with reference to the accompanying drawings and subsequently claimed.

In the drawings: Figure 1 represents a side elevation of a portion of a vehicle-pole tipped with an ordinary ferrule-like hold-back iron or tip provided with my improvements; Fig. 2, a transverse section taken on line 2—2 of the preceding figure; Fig. 3, a side elevation illustrating my improvements in connection with a strap-like hold-back iron of ordinary construction, and Fig. 4, a plan view of my neck-yoke retaining means detachably connected to that form of hold-back iron or pole-tip shown in Fig. 3.

Referring by letter to the drawings, A represents a vehicle-pole having its forward end tipped with a hold-back iron B in either a ferrule or strap like form according as said pole is for light or heavy draft-vehicles. For the adaptation of my neck-yoke retaining means to new hold-back irons, I prefer to form each of the latter with a pair of parallel ears $b$ that are also preferably arranged in rear of the vertically disposed portion $c$ of said iron. The ears $b$ serve as bearings for a pivot-pin or bolt C that loosely engages the bifurcated rear end of a hook D shown in Figs. 1 and 2 as extended forward under the vertically disposed portion $c$ of the hold-back iron and having its forward end maintained in contact with said hold-back iron by the power of a spring E under tension on the pivot-pin or bolt, above specified, intermediate of the hook-furcations $d$. In order to prevent damage to the spring E I provide a stop $e$ for limiting pivotal movement of the hook D on the pivot-pin or bolt, this stop being preferably a lug that forms part of said hook, as herein shown.

In order that my improvements may be applied to hold-back irons already in use, especially those having the form shown in Fig. 3, I employ a clamp F having the pivot-pin ears $b$ integral therewith, but in any case it is to be observed that the spring-controlled hook is connected to a hold-back iron independent of the pole, and like in my prior patent, the forward end of said hook is preferably beveled to facilitate the slipping of a neck-yoke ring between the same and said hold-back iron.

As explained in my prior patent, the neck-yoke ring bears normally against the vertically disposed portion of the hold-back iron, but if it be drawn or slip forward, the hook D will prevent its disengagement with the pole.

It is obvious that my device may be also applied to the shafts or thills of a vehicle for engagement with the straps or other appliances holding up the same, to guard against accidental disengagement, and to prevent their falling.

Having thus described my invention, what I claim as new, and desire to secure by Letters Patent, is—

1. The combination of a hold-back iron, depending parallel ears in rear of the vertically disposed portion of the iron, a pivot engaging the ears, a forwardly extended hook having rear furcations engaging the pivot, and a resistance to downward movement of the hook in the form of a spiral spring under tension on said pivot intermediate of the hook furcations, substantially as set forth.

2. The combination of a hold-back iron, depending parallel ears in rear of the vertically disposed portion of the iron, a pivot engaging the ears, a forwardly extended hook having rear furcations engaging the pivot, a stop lug constituting part of the hook at the rear thereof, and a resistance to downward movement of said hook in the form of a spiral spring under tension on said pivot intermediate of the hook furcations, substantially as set forth.

In testimony that I claim the foregoing I have hereunto set my hand, at Grand Rapids, in the county of Wood and State of Wisconsin, in the presence of two witnesses.

JOSEPH O. HEBERT.

Witnesses:
FRANK STARR,
A. L. FONTAINE.